(12) United States Patent
Richard

(10) Patent No.: US 6,227,513 B1
(45) Date of Patent: *May 8, 2001

(54) SUPPORTING DEVICE

(75) Inventor: Bryce Richard, Waimarama (NZ)

(73) Assignee: Jazzac International Limited, Waimarama (NZ)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 5 days.

(21) Appl. No.: 09/171,657

(22) PCT Filed: Apr. 22, 1997

(86) PCT No.: PCT/NZ97/00048

§ 371 Date: Oct. 21, 1998

§ 102(e) Date: Oct. 21, 1998

(87) PCT Pub. No.: WO97/39665

PCT Pub. Date: Oct. 30, 1997

(30) Foreign Application Priority Data

Apr. 24, 1996 (NZ) ........................................ 286449

(51) Int. Cl.[7] .................................................. A47B 91/00
(52) U.S. Cl. ................... 248/346.07; 248/149; 248/310; 248/313; 248/354.7; 211/43
(58) Field of Search .............................. 248/346.07, 154, 248/146, 311.2, 313, 316.4, 310, 149, 354.7; 211/23, 24, 43

(56) References Cited

U.S. PATENT DOCUMENTS

| 13,787 | * | 11/1855 | Perlmutter ............................. 297/113 |
| 113,830 | * | 4/1871 | Anderson ................................. 211/43 |
| 1,684,925 | * | 9/1928 | Perlmutter ......................... 248/346.07 |
| 1,828,249 | * | 10/1931 | Hammond ............................. 248/154 |
| 2,313,115 | * | 3/1943 | Allen et al. ............................ 248/154 |
| 2,665,872 | * | 1/1954 | De Witt ................................. 248/362 |
| 2,881,502 | * | 4/1959 | Dopera ................................ 248/176.2 |
| 3,904,158 | * | 9/1975 | Michael ................................ 248/149 |
| 4,118,002 | * | 10/1978 | Bartlett .............................. 248/311.2 |
| 4,549,727 | * | 10/1985 | Kozar ................................... 248/310 |
| 4,897,958 | * | 2/1990 | Brydges ................................ 248/208 |
| 5,149,032 | * | 9/1992 | Jones et al. ........................... 248/313 |
| 5,295,648 | * | 3/1994 | Hames ................................. 248/149 |
| 5,560,578 | * | 10/1996 | Schenken et al. ............... 248/229.21 |

* cited by examiner

Primary Examiner—Ramon O. Ramirez
Assistant Examiner—Kimberly Wood
(74) Attorney, Agent, or Firm—Cowan, Liebowitz & Latman

(57) ABSTRACT

This invention relates to a device (30) for supporting an object, the device comprising a base (1) and at least two brackets (20), the device (30) being configured and arranged such that, in use, each said bracket (20) is adjusted on the base (1) to bear against and support a said object. Desirably the brackets (20) are provided with at least one pawl (23, 24, 25) which, in use, engage corresponding ratchet teeth (4) in the base (1) when the brackets (20) are engaged and slidably adjusted on the base (1) to secure the said object in place.

10 Claims, 3 Drawing Sheets

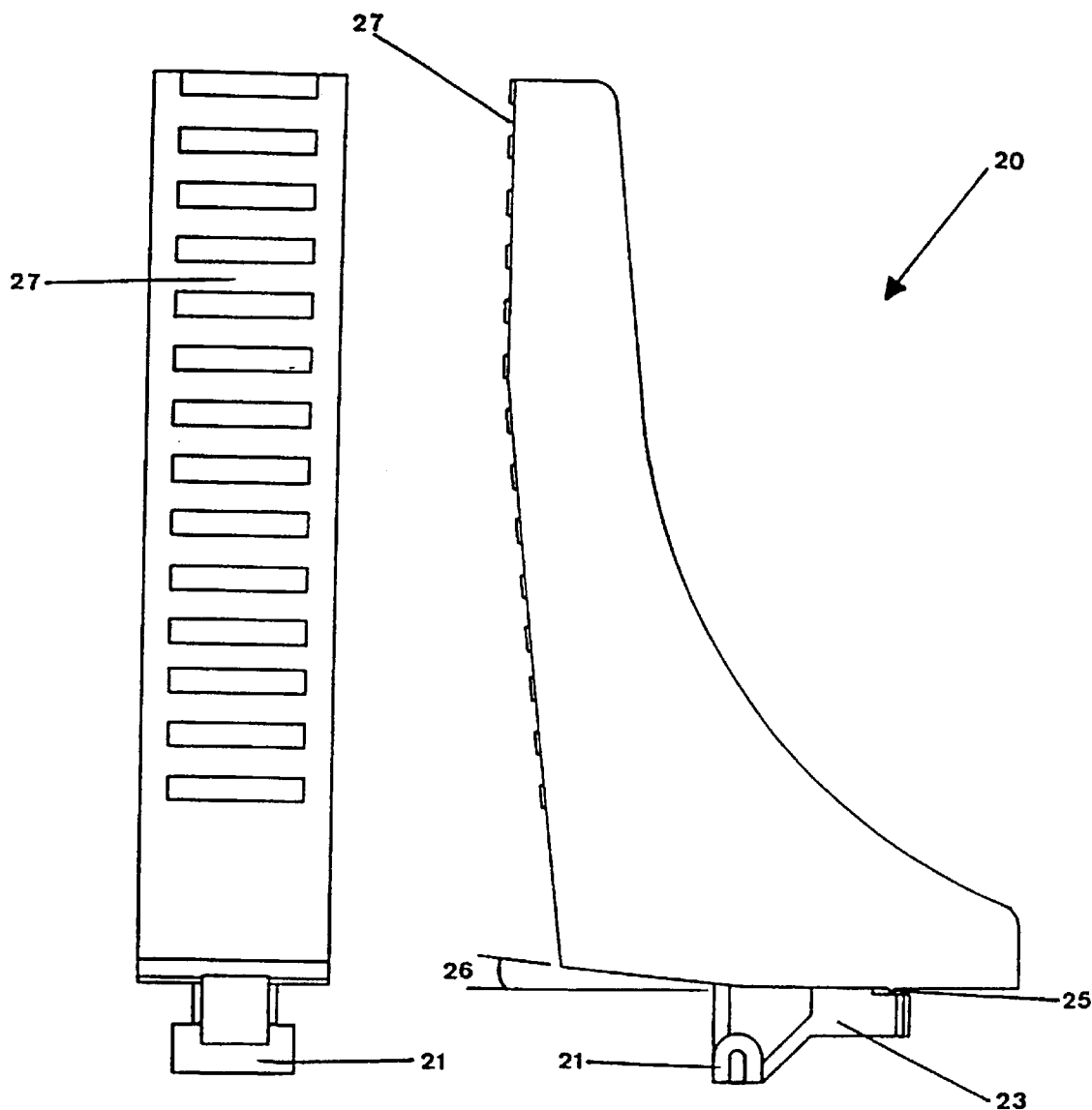
FIGURE 4    FIGURE 3
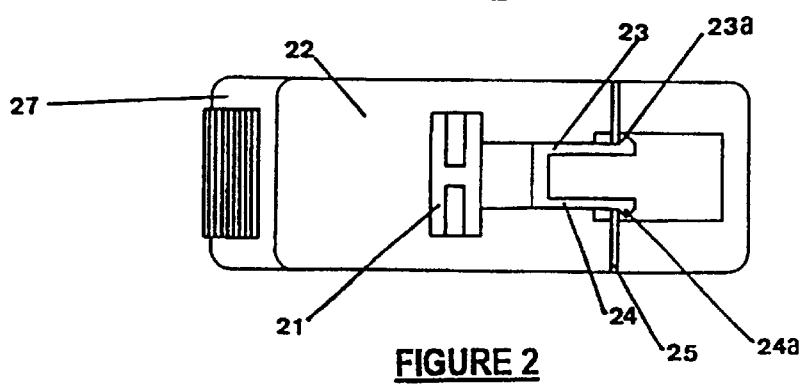
FIGURE 2

SUPPORTING DEVICE

TECHNICAL FIELD

This invention relates to supporting devices and stands. More particularly, but not exclusively, the present invention relates to a supporting device for retaining an object such as a bottle or container in an upright position.

BACKGROUND ART

Some objects are particularly vulnerable to damage, and some other objects are considered dangerous, if not transported or stored properly. Industry experts recommend that objects such as gas bottles should be used, stored and transported in an upright position. Goods such as petrol in containers, pails of paint, pot plants and fragile items such as crockery generally require some form of support during transportation and/or when being stored, and a supporting device is very desirable in such circumstances.

It is an object of the present invention to provide a device which overcomes at least some of the above mentioned problems, or which at least provides the public with a useful choice.

SUMMARY OF THE INVENTION

In a first broad aspect of the invention there is provided a device for supporting an object, the device comprising a base and at least two brackets, the device being arranged and configured such that, in use, each said bracket is adjusted on the base to bear against and support a said object therebetween.

It will immediately be appreciated that this invention provides a device which retains and secures an object in an upright position between a supporting base and brackets. This device offers the advantage of supporting fragile objects during transportation, storage or even during use. It will also be appreciated that this device is provided with brackets which are adjustable on the base to cradle and support an object.

Preferably the brackets are releasably engaged with the base. Desirably each said bracket is slidably adjusted relative to the base.

Preferably each bracket is provided with a pawl, and the base is provided with a ratchet for each respective said bracket such that, in use, each said bracket is movable over the said corresponding ratchet to abut a said object therebetween.

Preferably a guide means for each said bracket is provided on the base to guide each said bracket as it moves against the base during use.

Preferably the base is provided with base stabilising means. Desirably the base stabilising means includes spikes protruding from the underside of the base for frictional contact with the surface to which the base is resting upon.

Preferably the base is provided with outwardly projecting radiating portions, each said portion being adapted to receive a said bracket.

BRIEF DESCRIPTION OF THE DRAWINGS

A preferred embodiment of the invention will now be described by way of example only with reference to the accompanying drawings in which:

FIG. 2: illustrates a bottom view of a bracket of the supporting device according to the preferred embodiment of the invention;

FIG. 3: illustrates a side view of the bracket;

FIG. 4: illustrates a front view of the bracket; and

DETAILED DESCRIPTION OF THE DRAWINGS

Figure 1:
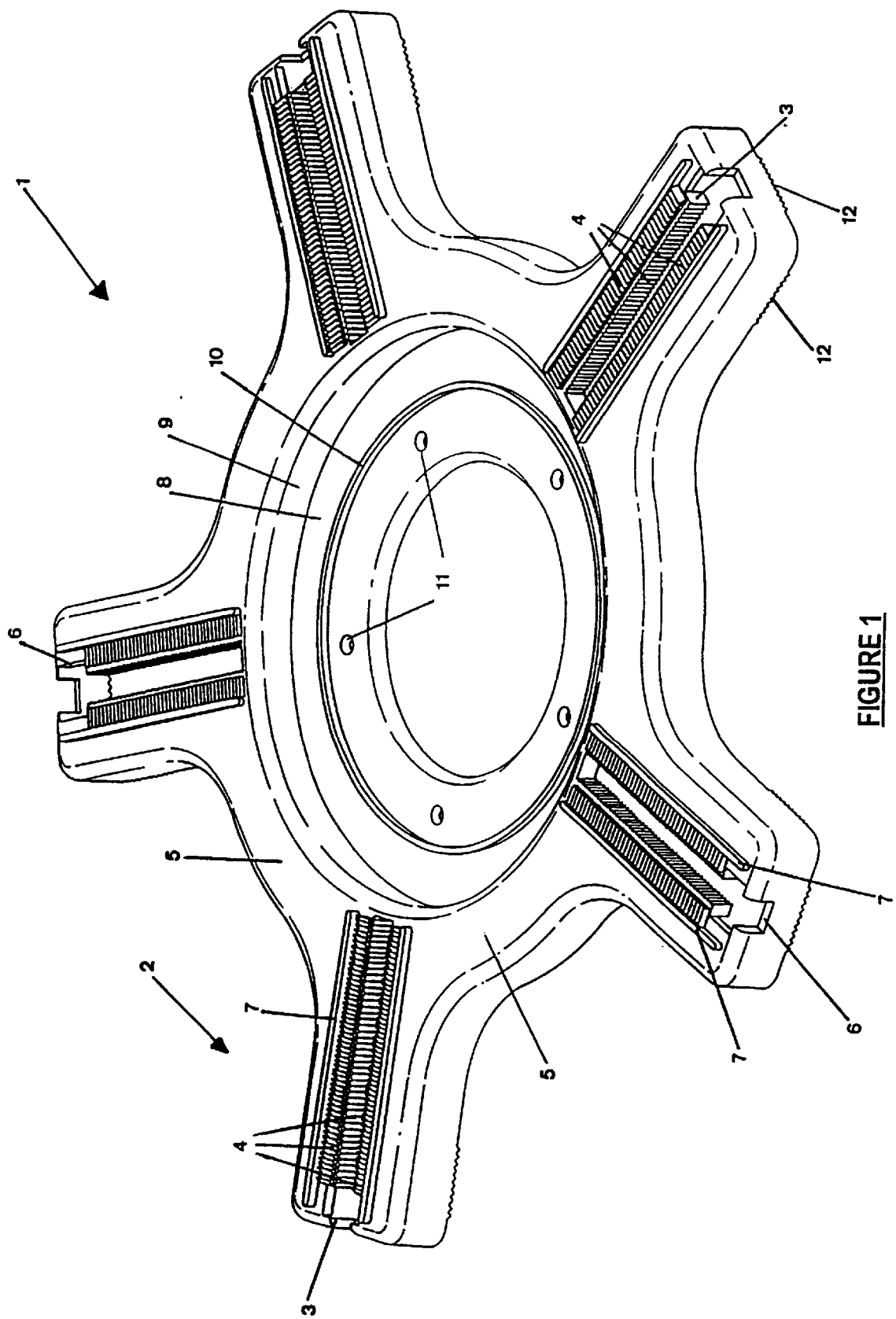
FIG. 1: illustrates a perspective view of the base of a supporting device according to a preferred embodiment of the invention.

Referring to FIG. 1, a base component, generally referred to as 1, of a supporting device according to a preferred embodiment of the invention, is illustrated. The base 1 is preferably manufactured by injection moulding of suitable plastics material. The base 1 is moulded with five radiating portions or legs 2, each leg 2 being moulded in the same form.

A channel 3 is formed in each leg 2 to guide, support and restrain a bracket 20 (as shown in FIGS. 2 to 5) during use. Ratchet teeth 4 are formed on both sides of the channel 3 and on the upper surface 5 of the base 1 to serve as the ratchet component of a ratchet and pawl system.

An opening 6 can be provided at either end of the ratchet 4 for the purpose of releasably engaging a retaining portion of the bracket 20. In this embodiment the opening 6 is adjacent the outside end of the channel 3. Guide means in the form of strips 7 are positioned on both sides of the channel 3 to guide and support the bracket 20 as it slides forwards and backwards along the channel 3.

Figure 5:
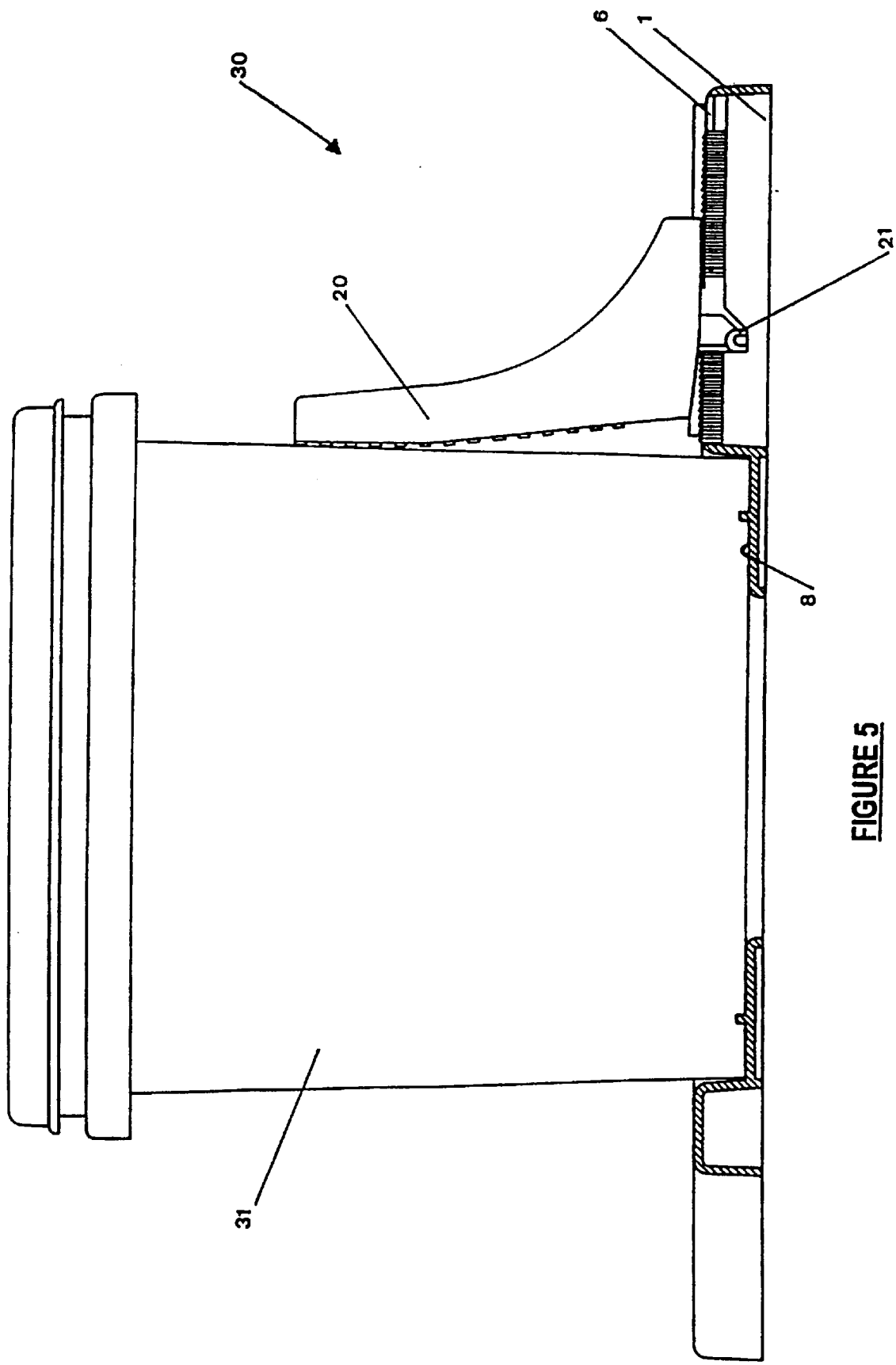
FIG. 5: illustrates a cross sectional side view through the supporting device according to the preferred embodiment of the invention.

A platform 8 is desirably moulded with a shoulder 9 which can assist with securing objects, of a particular size and shape in the centre of the base 1. The object may be, for example, a standard ten litre pail, as illustrated in FIG. 5 as object 31, with the outer surface of the ten litre pail abutting the shoulder 9 when positioned on the platform 8 of the base 1. A raised bead 10 extends about the platform 8 to allow an object, such as a standard four litre pail of paint, to be placed therebetween with the outer surface of the four litre pail abutting the inside surface of the bead 10. Provision is made for fastening the base to a horizontal surface in the form of holes 11 in the platform 8.

Desirably base stabilising means in the form of spikes 12 are provided on the base 1 adjacent the outer edge of each leg 2 for added stability when the base is placed, in use, on a soft surface such as carpet.

Referring to FIGS. 2 to 4, a bracket component of the supporting device, generally referred to as 20, according to a preferred embodiment of the invention, is illustrated.

A retaining portion 21 extends from the lower surface 22 of the bracket 20 and is T-shaped for retainment by the underside of the base 1. Pawls 23, 24 extend from the lower surface 22 in parallel and spaced apart from each other such that the outer side of the pawls 23, 24 are adjacent respective opposing sides of the channel 3 when the bracket 20 is in use.

The pawls 23, 24 are each provided with a catch 23a, 24a respectively which engage the ratchet teeth 4 in the channel 3 when the bracket 20 is received on the base 1. The catches 23a, 24a are angled at preferably 90 degrees as indicated in FIG. 3 as C. A pawl 25 protrudes from and extends across the lower surface 22 to engage with the ratchet teeth 4 on the upper surface 5 of the base 1 to retain the bracket 20 in position during use.

As seen clearly in FIG. 3, the lower surface 22 of the bracket 20 is not flat but has a reflex angle 26 to allow the bracket 20 to be rocked between a moving position and a locking position. The moving position is with the bearing face 27 of the bracket 20 tilted forward and the pawl 25 raised away from the ratchet teeth 4. In this position the bracket 20 can be moved freely forward or rearward along the channel 3. The locking position is with the bearing face 25 tilted rearward and the pawl 26 and catches 23a, 24a located between the ratchet teeth 4. In this locked position the bracket 20 can not be moved freely.

It will be appreciated that the height of the bracket depends on factors such as the size of the base 1, the bracket 20, and the object to be secured.

Referring to FIG. 5, the bracket 20 and the base unit 1 components are shown, in use, as a supporting device 30 according to the preferred embodiment of the invention.

In operation, an object 31 is placed on the platform 8 at the centre of the base 1. The retaining portion 21 of each bracket 20 is received through respective openings 6 in the base 1 until the lower surface 22 of each bracket 20 is in frictional movement with the upper surface 5 of each respective leg 2 of the base 1. Each bracket 20 is then tilted forward to its moving position and moved inwards toward the object 31 with the catches 23a, 24a and pawl 25 freely moving past the ratchet teeth 4 in each channel 3 until the bearing face 27 abuts or bears against the object 31 and the brackets 20 are tilted to their locking positions, as seen in FIG. 5.

It will be appreciated that the length of a leg 2 will be determined by factors such as the outer circumference of an object to be secured in the base. The wider or larger the object to be secured the longer the radiating legs 2 must be formed to accommodate the object. It will also be appreciated that a longer leg 2, accompanied by ratchet teeth 4 extending the length of the leg 2 will increase the range of adjustment and therefore allow a variety of objects with differing outer circumferences to be secured by the supporting device 30.

It will be further appreciated that the brackets can be adapted with a larger bearing face against the object to be secured to increase the degree of support for the object. This also can result in some cases, to only require two brackets to support an object. Furthermore, if the platform of the base 1 can also be designed to accommodate a particular design of object base, then less support is required by the brackets. This can be seen by the object 31 illustrated in FIG. 5 which fits precisely on the platform 8.

Additional advantages of the present invention will become apparent for those skilled in the art after considering the principles in particular form as discussed and illustrated. Thus, it will be understood that the invention is not limited to the particular embodiments described or illustrated, but is intended to cover all alterations or modifications which are within the scope of the appended claims.

What is claimed is:

1. A device for supporting an object, the device comprising a base and at least two brackets, the base being provided with at least two radially extending channels having ends, each of said channels being adapted to retain one of said brackets slidably thereon, each said bracket being releasable from the base at either or both ends of said channel, and the bracket and the channel being adapted with a bracket adjustment means for slidably adjusting the position of the bracket along each respective said channel to bear against and support the object positioned between the brackets, wherein said bracket adjustment means includes a pawl provided at the base of each said bracket, and each said channel is provided with a ratchet arrangement substantially along its length such that, in use, each said pawl is slidable in increments over each said ratchet arrangement.

2. A device according to claim 1 wherein each said bracket is adapted with an angled bottom face to enable the bracket to be tiltable to disengage the pawl of the bracket from a corresponding said ratchet arrangement and enable the bracket to slide along the channels until the bracket is released from the base.

3. A device according to claim 2 wherein the base is provided with an aperture at the end of each said channel to enable the brackets to be releasable from the base.

4. A device according to claim 3 wherein the aperture is at the inside end of each said channel.

5. A device according to claim 1 wherein a guide means for each said bracket is provided on the base adjacent each said channel to guide the bracket as it is slidingly adjusted along the channel.

6. A device according to claim 1 wherein the base is provided with base stabilizing means.

7. A device according to claim 6 wherein the base stabilizing means includes spikes protruding from the underside of the base for frictional contact with a surface to which the base is resting upon.

8. A device according to claim 1 wherein the base is provided with outwardly projecting radiating portions, each said radiating portion being in association with a said bracket.

9. A device for supporting an object, the device comprising a base having between three to six outwardly projecting radiating portions, each said radiating portion being provided with a channel, a bracket releasably engaged within each of said channels, each said bracket having a retaining portion adjacent the bottom face of the bracket to retain the bracket in an upright position on the horizontally disposed base, a pawl being provided at the base of the bracket, and wherein the channels are provided with ratchet teeth substantially along the top faces and opposing inner faces of the channel such that each said bracket, in use, is slidable in increments over the ratchet teeth for slidably adjusting the position of each said bracket along each respective said channel to bear against and support a said object positioned between the brackets.

10. A device according to claim 2, wherein said pawl of each of said brackets is disposed on said base of the bracket substantially away from an object being supported, and said angled bottom face of each of said brackets is disposed at an end near the object being supported to enable the bracket to be tiltable towards the object being supported to disengage the pawl from the corresponding ratchet.

* * * * *